United States Patent [19]

Nomura

[11] Patent Number: 4,815,060
[45] Date of Patent: Mar. 21, 1989

[54] OPTICAL PICKUP DEVICE WITH TRACKING AND FOCUSING UTILIZING A PHOTODETECTOR HAVING FOUR REGIONS

[75] Inventor: Susumu Nomura, Saitama, Japan

[73] Assignee: Pioneer Electronic Corporation, Tokyo, Japan

[21] Appl. No.: 104,017

[22] Filed: Oct. 5, 1987

[30] Foreign Application Priority Data

Oct. 3, 1986 [JP] Japan ............... 61-152109[U]

[51] Int. Cl.$^4$ .............................. G11B 7/00
[52] U.S. Cl. ........................... 369/46; 250/201
[58] Field of Search ............... 369/43–47; 358/342; 250/201 DF

[56] References Cited

U.S. PATENT DOCUMENTS

| 4,682,315 | 7/1987 | Uejima | 369/46 X |
| 4,700,334 | 10/1987 | Shinkai | 369/46 X |

FOREIGN PATENT DOCUMENTS

| 0228620 | 7/1987 | European Pat. Off. |
| 2810566 | 9/1978 | Fed. Rep. of Germany |
| 3142125 | 10/1984 | Fed. Rep. of Germany |
| 3315220 | 11/1984 | Fed. Rep. of Germany |
| 3534776 | 2/1985 | Fed. Rep. of Germany |
| 3507070 | 9/1985 | Fed. Rep. of Germany |
| 3640660 | 6/1987 | Fed. Rep. of Germany |

OTHER PUBLICATIONS

Search Report of West German Patent Office.

Primary Examiner—Robert L. Richardson
Attorney, Agent, or Firm—Sughrue, Mion, Zinn, Macpeak & Seas

[57] ABSTRACT

In an optical pickup device for a compact disk or the like, the photodetector is divided into four regions by three parallel division lines. A focus error signal is produced by forming the difference between the sum of the outputs of the inner two regions and the sum of the outputs of the outer two regions, while a tracking error signal is generated by forming the difference between the outputs of one of the outer regions and its adjacent inner region. The sum of the widths of the two inner regions is set such that the focus error signal is zero when the reflected beam is in focus on the disk. The direction of movement of the track is inclined with respect to the division lines so that the differences in outputs from each of the adjacent inner and outer regions is zero or a minimum. The direction of movement of the light beam during tracking is parallel to the division lines.

2 Claims, 3 Drawing Sheets

OPTICAL PICKUP DEVICE WITH TRACKING AND FOCUSING UTILIZING A PHOTODETECTOR HAVING FOUR REGIONS

BACKGROUND OF THE INVENTION

The present invention relates to an optical pickup device suitable for recording and reproducing data in a digital mode.

FIG. 1 shows the arrangement of a photodetector in a conventional optical pickup device. The photodetector 6 is divided into regions 11, 12, 13 and 14 by three division lines. The outputs of the inner regions 11 and 12 are applied to an addition circuit 15, whereas the outputs of the outer regions 13 and 14 are supplied to an addition circuit 16. The difference between the outputs of the addition circuits 15 and 16 is calculated by a differential amplifier 19. An optical element such as a cylindrical lens imparts astigmatism to the light beam applied to the photodetector. The width (the sum of the widths) of the regions 11 and 12 is determined so that the output of the differential amplifier 19 is zero when the optical system is focused on an object. When the optical system is defocused, the section of the light beam on the photodetector is changed from a circle into a vertically or horizontally elongated ellipse. Therefore, the output of the differential amplifier 19 may be used as a focus error signal according to the so-called "astigmatism principle".

On the other hand, the outputs of the regions 11 and 13 on the left-hand side are applied to an addition circuit 17, whereas the outputs of the regions 12 and 14 on the right-hand side are supplied to an addition circuit 18. The difference between the outputs of the addition circuits 17 and 18 is calculated by a differential amplifier 20. Under the untracked condition, that is, under the condition where the center of a pit formed on the disk is not irradiated by a beam, amounts of light being diffracted by the pit (the portions indicated by oblique lines in the figure) are made different. As a result, the difference between the outputs of the addition circuits 17 and 18 is obtained, which is representative of the tracking error signal is called as "push-pull principle" and is known in the art.

When, in response to the tracking error signal, the objective lens (not shown) is moved in a direction perpendicular to the track, the light beam is moved on the photodetector 6 in a direction S perpendicular to the direction T. As a result, the focus error signal and the tracking error signal include components other than the true error components, and accordingly it is impossible to perform focus control and tracking control operations with high accuracy.

SUMMARY OF THE INVENTION

Overcoming these problems, in accordance with the invention, a photodetector is divided into four regions by three parallel division lines, and the direction of a track is determined with respect to the division lines so that the effects of the diffracted light from a track on the disk are cancelled out in the focus error signal.

More specifically, according to the invention there is provided an optical pickup device which comprises: a light source; and objective lens for focusing on a disk a light beam emitted from the light source; a photodetector for detecting a light beam reflected from the disk, the photodetector being divided into first, second, third and fourth regions by three parallel division lines; optical means for astigmatizing the light beam incident on the photodetector; a first differential amplifier receiving a signal provided by adding the outputs of the first and second regions, which are the inner regions of the photodetectors, and a signal provided by adding the outputs of the third and fourth regions, which are the outer regions of the photodetector, and in response producing a focus error signal; and a second differential amplifier receiving at least one of the outputs of the first and third regions and at least one of the outputs of the second and fourth regions and in response producing a tracking error signal. The sum of the widths of the first and second regions is determined so that the focus error signal is zero when the light beam is focused on the disk. The direction of movement of a track is inclined with respect to the division lines such that the difference between components of the diffracted light of the track in the first and third regions and the difference between components of the diffracted light of the track in the second and fourth regions are zero, or at least a minimum, and the direction of movement of the light beam during tracking is parallel to the division lines.

The photodetector which detects the astigmatized light beam is divided into four regions by three parallel division lines so that focus control can be performed employing the astigmatism method. The direction of the track being followed is inclined with respect to the division lines so that the components of the diffracted light of the track falling in the first and third regions are equal in level.

DETAILED DESCRIPTION OF THE PREFERRED EMBODIMENTS

Figure 3:
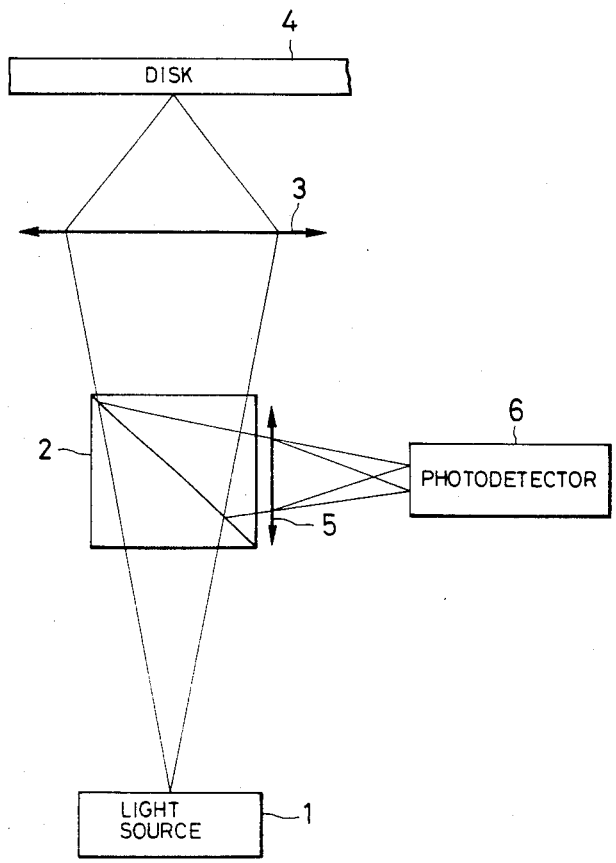
FIG. 3 is an explanatory diagram showing the arrangement of an optical pickup device using the inventive photodetector.

FIG. 3 is a diagram used to illustrate the operating principles of the optical pickup device according to the invention. In FIG. 3, reference numeral 1 designates a light source such as a semiconductor laser. A light beam emitted by the light source is applied to a beam splitter 2. The light beam passed through the beam splitter 2 is focused on a disk 4 by an objective lens 3. The light beam reflected from the disk 4 is applied through the objective lens 3 to the beam splitter 2, where it is reflected. The light beam thus reflected is applied through an optical element, namely, a cylindrical lens 5, where it is astigmatized. The light beam thus astigmatized is detected by a photodetector 6.

Figure 2:
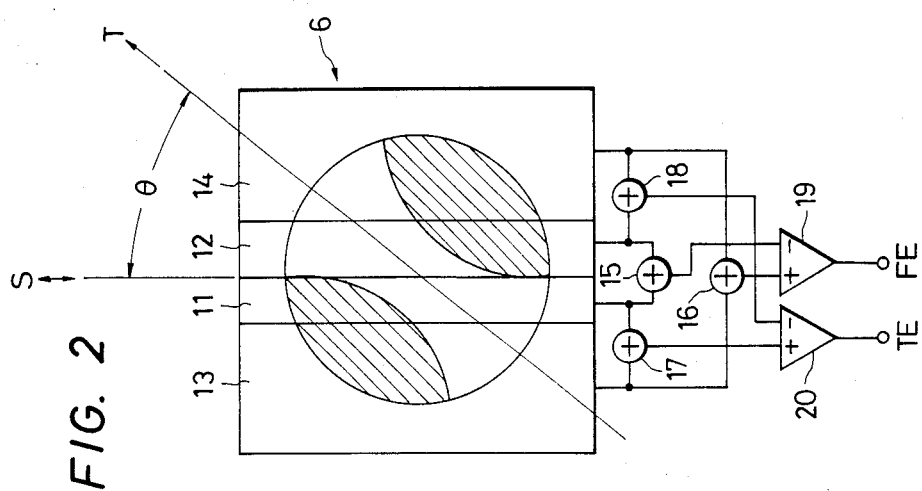
FIG. 2 is an explanatory diagram showing the arrangement of (a photodetector according to the invention.

As in the case of the photodetector 6 of FIG. 2, the photodetector 6 of the invention is divided into four regions 11, 12, 13 and 14 by three parallel lines, as shown in FIG. 2. Since the light beam is astigmatized by the cylindrical lens 5, the light spot on the photodetector 6 is substantially circular when the beam is focused on the disk 4; however, the light spot becomes elliptical, either vertically or horizontally elongated, when the disk 4 is not located at the focused position (i.e., the disk is located either in front of or behind the focused position).

The outputs of the regions 11 and 12 are applied to an addition circuit 15, whereas the outputs of the regions 13 and 14 are supplied to an addition circuit 16. The difference between the outputs of the addition circuits 15 and 16 is calculated by a differential amplifier 19. The sum of the widths of the regions 11 and 12 is determined so that the output of the differential amplifier 19 is zero when the disk 4 is at the focused position. Accordingly, as the disk 4 is moved away from the focused position, the differential amplifier 19 provides an output corresponding to the amount of movement of the disk 4 from the focused position. Therefore, the output of the differential amplifier 19 can be employed as a focus error signal, and the position of the objective lens 3 controlled according to this focus error signal.

The outputs of the regions 11 and 13 on the left-hand side of the photodetector 6 are supplied to an addition circuit 17, whereas the outputs of the regions 12 and 14 on the right-hand side of the photodetector are applied to an addition circuit 18. The difference between the outputs of the addition circuits 17 and 28 is calculated by a differential amplifier 20, and the output of the differential amplifier is employed as a tracking error signal.

Figure 1:
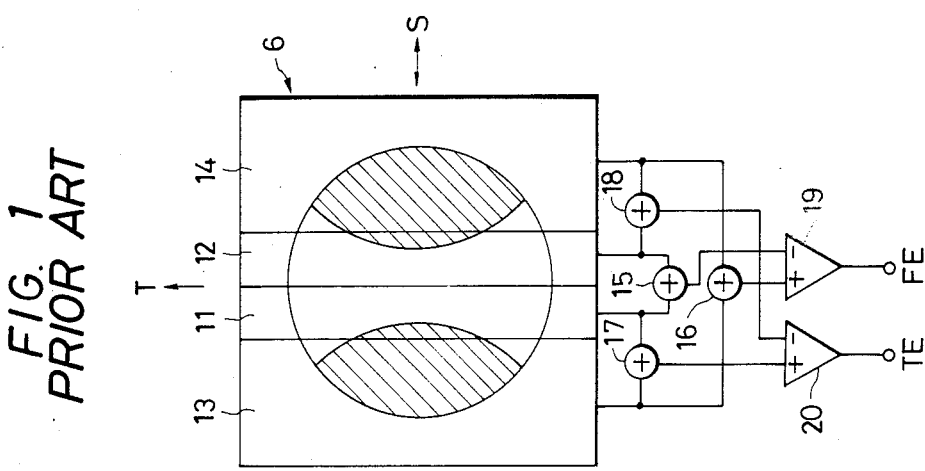
FIG. 1 is an explanatory diagram showing the arrangement of a conventional photodetector.

The arrangement described thus far is the same as that of the conventional photodetector shown in FIG. 1.

Departing, however, from the prior art approach, in the photodetector of the invention, the track movement direction T forms an angle $\theta$ with respect to the division lines, and the direction of movement of the objective lens 3, that is, the direction S of movement of the light spot on the photodetector 6 is parallel to the division lines. Stated another way, the beam irradiated onto the disk moves while forming the angle $\theta$ with respect to the track direction, and sine component in the movement direction is used as performing the tracking control operation. At this time, since the beam on the detector 6 moves along the division lines, the tracking error and focus error signals are not adversely affected.

In the case where the direction of movement of the objective lens 3 is not perpendicular to the track, jitter components will appear in the reproduced signals. That is, assuming that the movement distance of the beam on the disk is d, the jitter components will appear in the reproduced signal since the beam precedes or comes after by a distance of d·cos $\theta$ in the track direction. However, such jitter components can be sufficiently corrected in the case where the signals recorded and reproduced are digital signals as in the case of a CD (compact disk).

Components (indicated by shading in FIG. 2) of the diffracted light of a track are symmetrical with respect to the direction T. Depending on the angle $\theta$, the components of the diffracted light can adversely affect the focus error signal. Therefore, in accordance with the invention, the angle $\theta$ is determined so that the difference between the diffracted light components in the regions 11 and 13 and the difference between the diffracted light components in the regions 12 and 14 are both zero, or at least a minimum. In other words, the angle $\theta$ is determined so that the output of the region 11 is the same, or nearly the same, as that of the region 13, and the output of the region 12 is the same, or nearly the same, as that of the region 14. By determining the angle $\theta$ in this manner, the adverse effects of the diffracted light of the track on the focus error signal can be cancelled or minimized.

The tracking error signal can be formed by using the difference between the outputs of the regions 11 and 12, or the difference between the outputs of the regions 13 and 14.

As is apparent from the above description, the optical pickup device according to the invention comprises a light source; an objective lens for focusing the light beam from the light source on a disk; a photodetector for detecting a light beam reflected from the disk, the photodetector being divided into four regions by three parallel division lines; optical means for astigmatizing the light beam incident on the photodetector; a first differential amplifier receiving a signal provided by adding the outputs of the first and second regions, which are the inner regions of the photodetector, and the outputs of the third and fourth regions, which are the outer regions of the photodetector, to form the focus error signal; and a second differential amplifier receiving at least one of the outputs of the first and third regions and at least one of the outputs of the second and fourth regions and producing the tracking error signal in response thereto.

In this device, the sum of the widths of the first and second regions is determined so that the focus error signal is zero when the light beam is focused on the disk, and the track movement direction is inclined with respect to the division lines so that the difference between the diffracted light components in the first and third regions and that between the diffracted light components in the second and fourth regions are zero, or at least a minimum, and the direction of movement of the light beam during tracking is parallel to the division lines. With this arrangement, both the tracking error signal and the focus error signal can be generated with a high accuracy.

What is claimed is:

1. An optical pickup device comprising:

a light source;

an objective lens for focusing a light beam from said light source on a disk;

a photodetector for detecting a light beam reflected from said disk, said photodetector being divided into inner first and second regions and outer third and fourth regions by three parallel division lines;

optical means for astigmatizing a reflected portion of said light beam incident on said photodetector;

means for adding outputs of said first and second regions;

means for adding outputs of said third and fourth regions;

a first differential amplifier receiving an output signal produced by said means for adding said outputs of said first and second regions and an output signal produced by said means for adding outputs of said third and fourth regions for thereby producing a focus error signal; and a second differential amplifier receiving at least one of said outputs of said first and third regions and at least one of said outputs of said second and fourth regions for thereby producing a tracking error signal, and wherein the sum of the widths of said first and second regions is such that said focus error signal is zero when said light beam is focused on said disk, the direction of movement of a track relative to said pickup is inclined with respect to said division lines at an angle such that the difference between components of diffracted light from said track in said first and third regions and the difference between components of diffracted light from said track in said second and fourth regions are a minimum, and the direction of movement of said light beam during tracking is parallel to said division lines.

2. The optical pickup device of claim 1, wherein said difference between components of diffracted light from said track in said first and third regions and said difference between components of diffracted light from said track in said second and fourth regions are zero.

* * * * *